(12) United States Patent
Aharony et al.

(10) Patent No.: US 10,498,480 B2
(45) Date of Patent: Dec. 3, 2019

(54) SYSTEM AND METHOD FOR PHOTONIC DISTRIBUTION OF MICROWAVE FREQUENCY ELECTRICAL SIGNAL FOR DISTRIBUTED MICROWAVE MIMO COMMUNICATIONS

(71) Applicant: HUAWEI TECHNOLOGIES CO., LTD., Shenzhen, Guangdong (CN)

(72) Inventors: Ahikam Aharony, Ottawa (CA); Shaul Klein, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/875,065

(22) Filed: Jan. 19, 2018

(65) Prior Publication Data
US 2019/0229831 A1 Jul. 25, 2019

(51) Int. Cl.
*H04J 14/00* (2006.01)
*H04J 14/02* (2006.01)
*H04B 7/0413* (2017.01)

(52) U.S. Cl.
CPC ........ *H04J 14/0265* (2013.01); *H04B 7/0413* (2013.01); *H04J 14/0216* (2013.01); *H04J 14/0221* (2013.01)

(58) Field of Classification Search
CPC .............. H04B 7/0413; H04B 10/2575; H04B 10/25751; H04B 10/25752; H04J 14/0265; H04J 14/0216; H04J 14/0221
(Continued)

(56) References Cited

U.S. PATENT DOCUMENTS

| | | | |
|---|---|---|---|
| 8,098,990 B2* | 1/2012 | Hu ...................... | H04J 14/0282 370/352 |
| 2005/0286908 A1* | 12/2005 | Way ................... | H04B 10/2575 398/186 |
| 2013/0170840 A1* | 7/2013 | Chang ................ | H04B 10/2575 398/115 |

FOREIGN PATENT DOCUMENTS

| CN | 103684618 A | 3/2014 |
|---|---|---|
| CN | 104467976 A | 3/2015 |
| CN | 105978630 A | 9/2016 |

OTHER PUBLICATIONS

Ingason, et al., Line-of-Sight MIMO for Microwave Links Adaptive Dual Polarized and Spatially Separated Systems Master of Science Thesis in Communication Engineering, 3.2.1 Optimal Antenna Separation (pp. 27-30), Department of Signals and Systems, Chalmers University of Technology, Göteborg, Sweden, Jul. 2019, http://publications.lib.chalmers.se/records/fulltext/98876.pdf (117 pages).

* cited by examiner

*Primary Examiner* — Mohammad R Sedighian
(74) *Attorney, Agent, or Firm* — BCF LLP

(57) ABSTRACT

A microwave transmit system is provided that makes use of optical fiber to convey a microwave frequency source. A local oscillator produces a microwave frequency source in electrical form. A directly modulated laser receives the first microwave frequency source and produces an optical signal. An optical fiber is used to convey the optical signal from the laser to a photodetector. The photodetector receives a first component of the optical signal and converts the first component of the optical signal to a second microwave frequency source in electrical form. A microwave modulator performs microwave modulation using the second microwave frequency source, and a microwave antenna configured to transmit an output of the first microwave modulator. For MIMO operation, there can be a second microwave (Continued)

modulator. The microwave frequency source can also be conveyed to the second microwave modulator using optical fiber, or the source can be proximate to one of the two microwave modulators, and conveyed to the other of the two microwave modulators using optical fiber.

19 Claims, 7 Drawing Sheets

(58) Field of Classification Search
 USPC .......................................... 398/72, 115, 116
 See application file for complete search history.

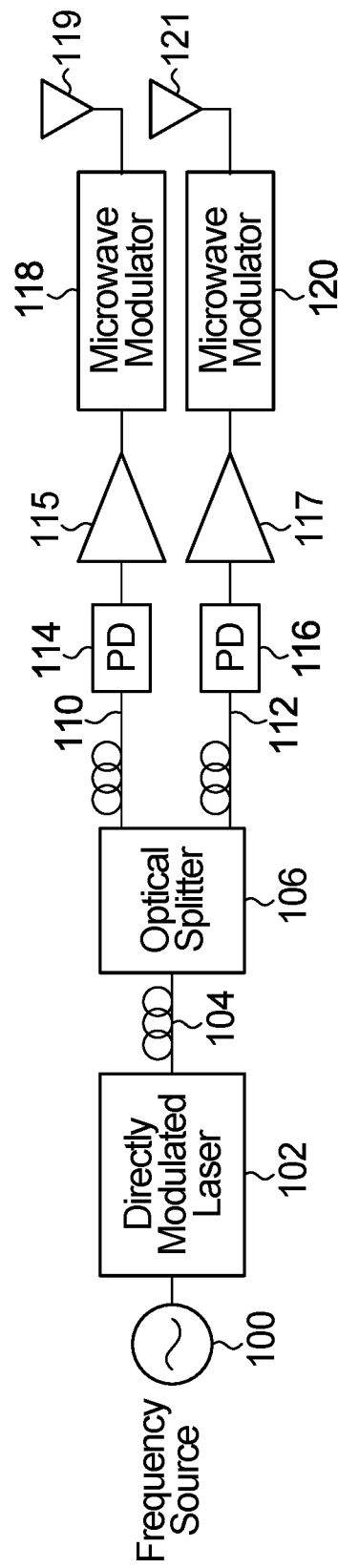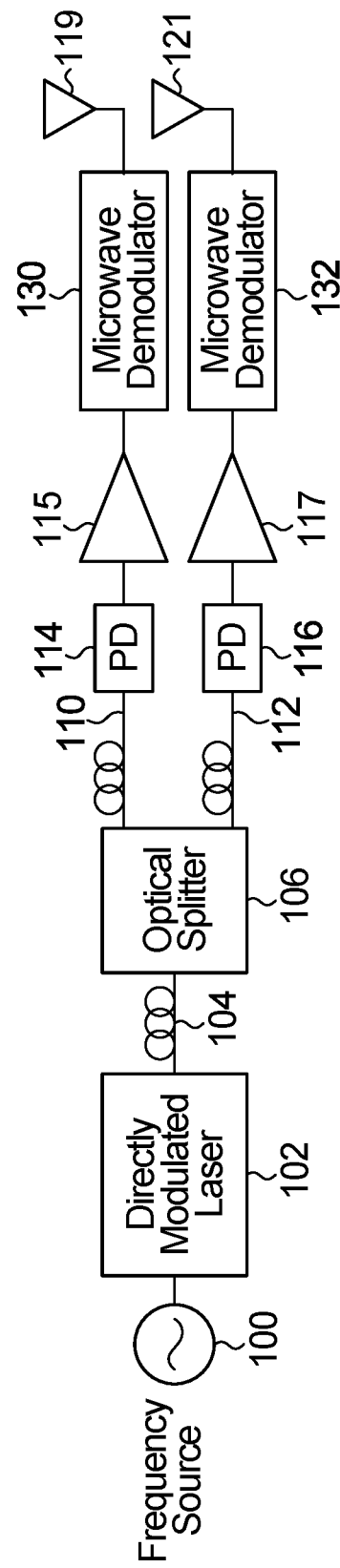

SYSTEM AND METHOD FOR PHOTONIC DISTRIBUTION OF MICROWAVE FREQUENCY ELECTRICAL SIGNAL FOR DISTRIBUTED MICROWAVE MIMO COMMUNICATIONS

FIELD

The application relates to microwave MIMO communications.

BACKGROUND

Line of sight (LOS) microwave MIMO communications typically involve two or more antennas separated by several meters. Various attempts to design LOS MIMO systems that can work with non-coherent frequency sources have not been successful. The alternative is LOS MIMO systems based on coherent frequency sources. However, the distribution of coherent frequency sources to multiple outdoor units for MIMO transmission or reception remains a significant hurdle for microwave MIMO systems.

In systems where a single frequency source is used with no special distribution mechanism, only a very small separation between antennas is possible resulting in low MIMO capacity.

To achieve better MIMO capacity, a larger separation between antennas of the outdoor units is required. In such systems, starting with a single frequency source, it is difficult to get the required coherence between the signals at the two antennas. Distribution of a single signal to multiple outdoor units over waveguides is costly and involves difficult installation procedures. Distribution over coaxial cable is costly and lossy.

SUMMARY

A microwave transmit system is provided that makes use of optical fiber to convey a microwave reference frequency signal provided by a local microwave frequency oscillator. A microwave frequency signal is converted to optical form with a modulated light source, e.g. a directly modulated laser diode. Then, the reference frequency signal, in optical form, is conveyed to one or more microwave modulators or demodulators. It is converted back to electrical form for use at the microwave modulators or demodulators. Advantageously, this allows a microwave frequency signal to be conveyed with precise frequency to a microwave modulator or demodulator located remote from the local oscillator.

According to one aspect of the present invention, there is provided a microwave transmit system comprising: a local oscillator configured to produce a first microwave frequency electrical signal; a light source configured to receive the first microwave frequency electrical signal and produce an optical signal; at least one optical fiber for conveying the optical signal; a first photodetector configured to receive a first component of the optical signal and convert the first component of the optical signal to a second microwave frequency electrical signal; a first microwave modulator configured to perform microwave modulation using the second microwave frequency electrical signal; a first microwave antenna configured to transmit an output of the first microwave modulator.

Optionally, the light source comprises a directly modulated laser diode.

Optionally, the system further comprises a second microwave modulator configured to receive the first microwave frequency electrical signal, and to perform microwave modulation using the first microwave frequency electrical signal; a second microwave antenna configured to transmit an output of the second microwave modulator.

Optionally, the system further comprises a first outdoor unit and a second outdoor unit, wherein: the first outdoor unit comprises the local oscillator, the light source, the second microwave modulator and the second microwave antenna; the second outdoor unit comprises the first photodetector, the first microwave modulator and the first microwave antenna.

Optionally, the system further comprises an optical splitter that splits the optical signal into the first component of the optical signal and a second component of the optical signal; wherein the at least one optical fiber comprises a first optical fiber for conveying the optical signal to the optical splitter, a second optical fiber for conveying the first component of the optical signal and a third optical fiber for conveying the second component of the optical signal; a second photodetector configured to receive the second component of the optical signal and convert the second component of the optical signal to a third microwave frequency electrical signal; a second microwave modulator configured to perform microwave modulation using the third microwave frequency electrical signal; a second microwave antenna configured to transmit an output of the second microwave modulator.

Optionally, the system further comprises an indoor unit, a first outdoor unit and a second outdoor unit, wherein: the first outdoor unit comprises the first photodetector, the first microwave modulator and the first microwave antenna; the second outdoor unit comprises the second photodetector, the second microwave modulator and the second antenna; the indoor unit comprises the local oscillator and the light source.

Optionally, the system further comprises a MIMO processor configured to produce first and second MIMO components from an input data stream, wherein the first microwave modulator is connected to receive and modulate the first MIMO component and the second microwave modulator is connected to receive and modulate the second MIMO component.

Optionally, the system further comprises a MIMO processor configured to produce first and second MIMO components from an input data stream, wherein the first microwave modulator is connected to receive and modulate the first MIMO component and the second microwave modulator is connected to receive and modulate the second MIMO component.

Optionally, the system further comprises a MIMO processor configured to produce first and second MIMO components from an input data stream, wherein the first microwave modulator is connected to receive and modulate the first MIMO component and the second microwave modulator is connected to receive and modulate the second MIMO component.

Optionally, the MIMO processor comprises a demultiplexer configured to demultiplex the input data stream into first and second data streams, and a MIMO precoder configured to produce first and second MIMO precoded outputs from the first and second data streams; wherein the first and second MIMO components are the first and second MIMO precoded outputs.

Optionally, the system is further configured to exchange data signals between the two outdoor units using the at least one optical fiber.

According to another aspect of the present invention, there is provided a microwave MIMO transmitter comprising the microwave transmit system as summarized above; a microwave MIMO receiver.

According to another aspect of the present invention, there is provided a first microwave MIMO transceiver comprising a first microwave MIMO transmitter and a first microwave MIMO receiver, the first microwave MIMO transmitter comprising the microwave transmit system as summarized above; a second microwave MIMO transceiver comprising a second microwave MIMO transmitter and a second microwave MIMO receiver.

According to another aspect of the present invention, there is provided a method comprising: producing a first microwave frequency electrical signal; producing an optical signal by modulating a light source using the first microwave frequency electrical signal; conveying the optical signal with at least one optical fiber; receiving a first component of the optical signal and converting the received first component to a second microwave frequency electrical signal; performing first microwave modulation using the second microwave frequency electrical signal; transmitting an output of said performing first microwave modulation with a first microwave antenna.

Optionally, the method further comprises receiving the first microwave frequency electrical signal, and performing second microwave modulation using the first microwave frequency electrical signal; transmitting an output of performing second microwave modulation with a second microwave antenna.

Optionally, the method further comprises splitting the optical signal into the first component of the optical signal and a second component of the optical signal with an optical splitter; wherein conveying the optical signal with an optical fiber comprises conveying the optical signal to the optical splitter with a first optical fiber, conveying the first component of the optical signal with a second optical fiber, and conveying the second component of the optical signal with a third optical fiber; the method further comprising: receiving the second component of the optical signal and converting the second component of the optical signal to a second microwave frequency electrical signal; performing second microwave modulation using the second microwave frequency electrical signal; transmitting an output of performing second microwave modulation with a second transmit antenna.

Optionally, the method further comprises performing MIMO processing to produce first and second MIMO components from an input data stream, wherein performing first microwave modulation comprises modulating the first MIMO component, and performing second microwave modulation comprises modulating the second MIMO component.

Optionally, performing MIMO processing comprises: demultiplexing the input data stream into first and second data streams; MIMO precoding the first and second data streams to produce first and second MIMO precoded outputs; wherein the first and second MIMO components are the first and second MIMO precoded outputs.

Optionally, the method further comprises exchanging data signals between two outdoor units using the at least one optical fiber.

BRIEF DESCRIPTION OF THE DRAWINGS

FIG. 1A depicts a block diagram of a MIMO microwave system, in which a single local oscillator is used to generate a microwave frequency electrical signal that is used for two microwave modulators.

FIG. 1B depicts a block diagram of a MIMO microwave system, in which a single local oscillator is used to generate a microwave frequency electrical signal that is used for two microwave demodulators.

DETAILED DESCRIPTION

Figure 1C:
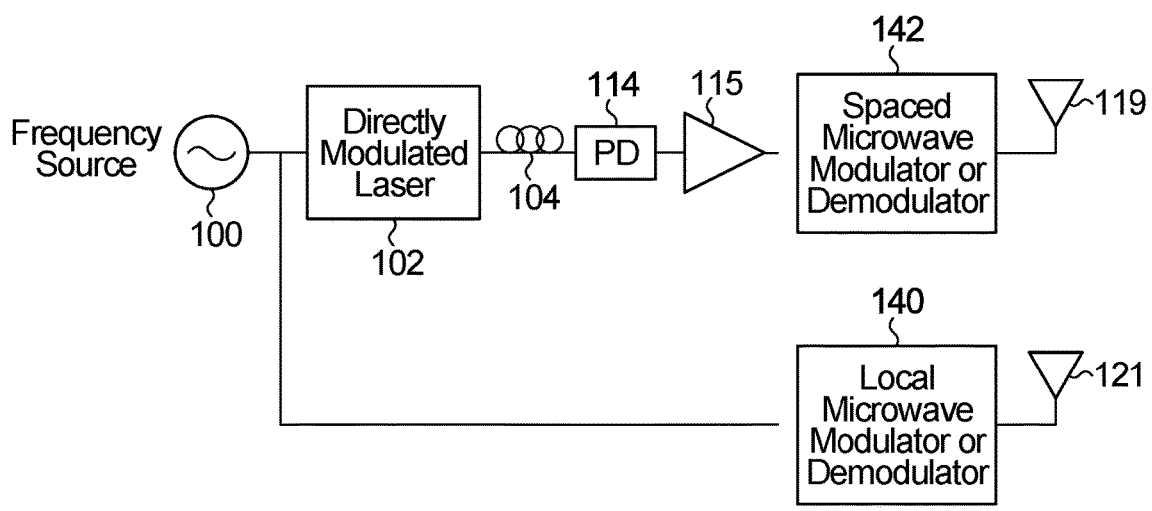
FIG. 1C depicts a block diagram of a MIMO microwave system, in which the microwave frequency electrical signal is provided local to one of the microwave modulators or demodulators, and delivered to the other of the microwave modulators or demodulators via an optical fiber.

Generally, embodiments of the present disclosure provide a method and system photonic distribution of a microwave frequency source signal, for example for distributed microwave MIMO communications For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

Referring now to FIG. 1A, shown is a block diagram of a MIMO microwave system provided by an embodiment of the invention, in which a single local oscillator is used to generate a microwave frequency electrical signal that is used for two microwave modulators. The system includes a local oscillator 100 that outputs a microwave frequency electrical signal. In some embodiments, the local oscillator 100 outputs a signal having a frequency in the range 6 GHz to 43 GHz but other frequencies are possible. The output of the local oscillator 100 is connected to the input of a directly modulated laser 102. More generally, any suitable modulated light source that produces an optical output can be employed, e.g. a modulated LED or a laser diode with an external modulator. The output of laser 102 is connected to an optical fiber 104 which is connected through splitter 106 to two optical fibers 110,112. Each optical fiber 110,112 is connected to a respective photodetector (PD) 114,116. The outputs of photodetectors 114,116 are connected through amplifiers 115,117 to microwave modulators 118,120 which are connected to microwave antennas 119,121. In some embodiments, the amplifier 115, microwave modulator 118 and antenna 119 are in a first outdoor unit, and the amplifier 117, microwave modulator 120 and antenna 121 are in a second outdoor unit. The two outdoor units are physically spaced from each other to achieve the desired separation for MIMO communications.

In operation, a microwave frequency electrical signal is generated by the local oscillator 100. This is converted to an optical signal by the directly modulated laser 102, and the optical signal is output on the fiber 104. The signal is split in splitter 106, with first and second components of the optical signal being directed to the two optical fibers 110, 112. Each of the two components of the optical signal is detected by a respective one of the two photodetectors 114,116 to reproduce the microwave frequency electrical signal at two places, namely at the inputs to the amplifiers 115, 117, which are connected to the respective two microwave modulators 118,120. Each microwave modulator 118, 120 performs microwave modulation using one of the two reproductions of the frequency source, and outputs a microwave signal on one of the microwave antennas 119,121.

An example power budget is as follows:

a. power at the output of the local oscillator 100: $P_{out\_LO}$ at +8 dBm b. power at the output of the directly modulated laser: $P_{out\_DML}$ at +12 dBm c. power at the input to the photodetector: $P_{in\_PD}$ at +6 dBm per receptor d. power at the output of the photodetectors: $P_{out\_PD}$ at −20 dBm e. power at output of amplifier: $P_{out\_Amp}$=+8 dBm.

Referring now to FIG. 1B, shown is a block diagram of a MIMO microwave system provided by an embodiment of the invention, in which a single local oscillator is used to generate a microwave frequency electrical signal for use by two microwave demodulators. The system is the same as that described with reference to FIG. 1A, except that the microwave modulators 118,120 of FIG. 1A are replaced with microwave demodulators 130,132. Operation is similar, but microwave signals are received by microwave antennas 119,121, and demodulated using the microwave demodulators 130,132 using the distributed microwave frequency electrical signal.

In another embodiment, the functionalities of FIGS. 1A and 1B are combined, with a first local oscillator generating a microwave frequency source signal for two modulators (for MIMO transmission), and a second local oscillator generating a microwave frequency electrical signal for two demodulators (for MIMO reception). In some embodiments, a strand containing two optical fibers is used to carry the transmit and receive microwave frequency signals.

In another embodiment, a fixed frequency spacing is used between the transmit and receive microwave frequency electrical signals. In such embodiments, a single microwave frequency electrical signal may be used. This is propagated to a first modulator and demodulator, and to a second modulator and demodulator using directly modulated laser, optical fiber and photodetectors as in the other embodiments. Differences between the required transmit and receive frequencies are handled elsewhere.

In some embodiments, in the case of a shared microwave frequency signal at the frequency of the transmit microwave frequency, the spacing between the transmit frequency and the receive frequency (for example 1008 MHz) is used inside the IDU to create the transmit receive spacing between the transmit and receive frequencies.

The single photonic distributed frequency source at the ODU will convert the radio frequency (RF) received signal to intermediate frequency (IF) received signal (sent to the IDU). The intermediate frequency is the frequency difference between the transmit and receive frequencies. The ODU will also convert an intermediate frequency transmit signal received from the IDU to an RF transmit signal.

Other architectures are possible. The examples of FIGS. 1A and 1B concern 2×2 MIMO for transmit, receive, or transmit and receive. A similar approach can be used for N×N MIMO for transmit, receive, or transmit and receive, where N>2.

In another embodiment, the microwave frequency electrical signal is provided local to one of the microwave modulators or demodulators, and delivered to the other of the microwave modulators or demodulators via an optical fiber. An example is depicted in FIG. 1C. Here, the microwave frequency electrical signal from local oscillator 100 is delivered directly, i.e. in electrical form, to one of the microwave modulators or demodulators, referred to as the local microwave modulator or demodulator 140 in FIG. 1C. The microwave frequency electrical signal is delivered to the other of the microwave modulators or demodulators, referred to as the spaced microwave modulator or demodulator because it is spaced physically from the local microwave modulator or demodulator 142, via the optical channel as described previously, without the need for a splitter. The split mount architecture of FIG. 4 described below is an example of this approach. In this case, the entire optical signal produced by the directly modulated laser is delivered to the spaced microwave modulator.

Figure 2A:
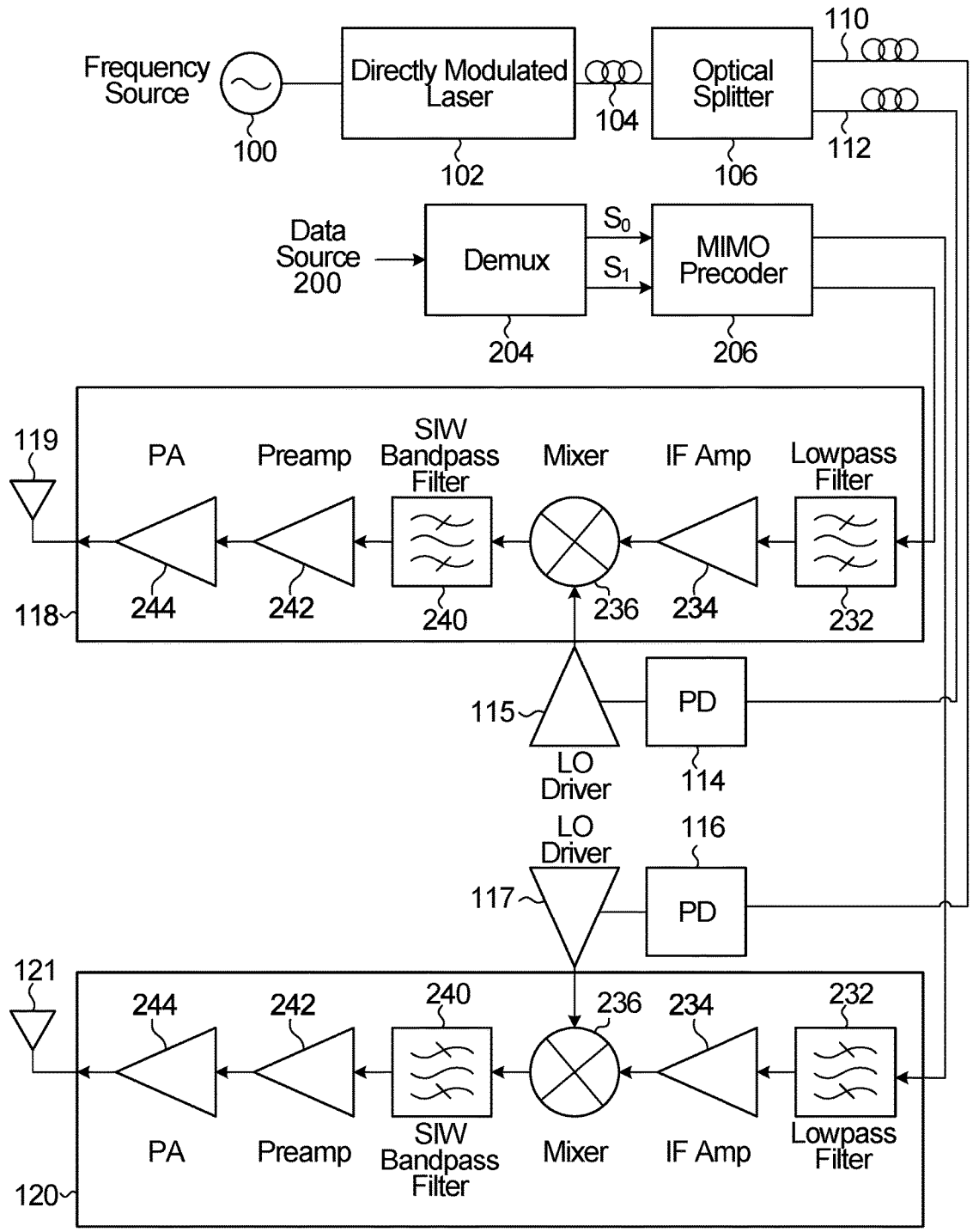
FIG. 2A depicts a block diagram of an example implementation of the microwave modulators and an example implementation of a path for data transmission.

Referring now to FIG. 2A, shown is a block diagram of a MIMO microwave system provided by an embodiment of the invention, which is based on the system of FIG. 1A, but shows specific details of an example implementation of the microwave modulators 118,120 and also shows an example implementation of a path for data transmission. More specifically, shown is a data source 200 connected to a demultiplexer 204 which demultiplexes data from the data source 200 into two data streams $S_0, S_1$. The two data streams are input to a MIMO precoder 206 which performs MIMO precoding to produce two MIMO precoded outputs for the two microwave modulators 118,120. More generally, in some embodiments, there is a MIMO processor that produces first and second MIMO components from an input data stream for modulation by the two microwave modulators. The demultiplexer 204 in combination with the MIMO precoder 206 is a specific example.

Details of an example implementation of microwave modulator 118 will be described. The example for microwave modulator 120 is the same. The microwave modulator 118 in this example includes a low-pass filter 232, IF (intermediate frequency) amplifier 234, mixer 236, substrate integrated waveguide (SIW) bandpass filter 240, preamplifier 242, and power amplifier 244 connected together in sequence. The mixer 236 is also connected to the output of amplifier 115. In operation, one of the precoded outputs is low-pass filtered in filter 232, and amplified in IF amplifier 234. Then, it is mixed with the microwave frequency electrical signal in mixer 236. The output of mixer 236 is filtered in bandpass filter 240, pre-amplified in preamplifier 242, and power amplified in power amplifier 244.

As an alternative to using a separate transmit path for data, as in the embodiment of FIG. 2A, in another embodiment, the MIMO precoded signals (outputs of MIMO precoder 206) are multiplexed with the microwave frequency electrical signal and delivered to the modulators 118,120 on the optical fibers 112,110. In a specific example, a second laser is modulated with the digital precoded signals and the result is multiplexed in the optical domain with the output of the directly modulated laser 102.

Figure 2B:
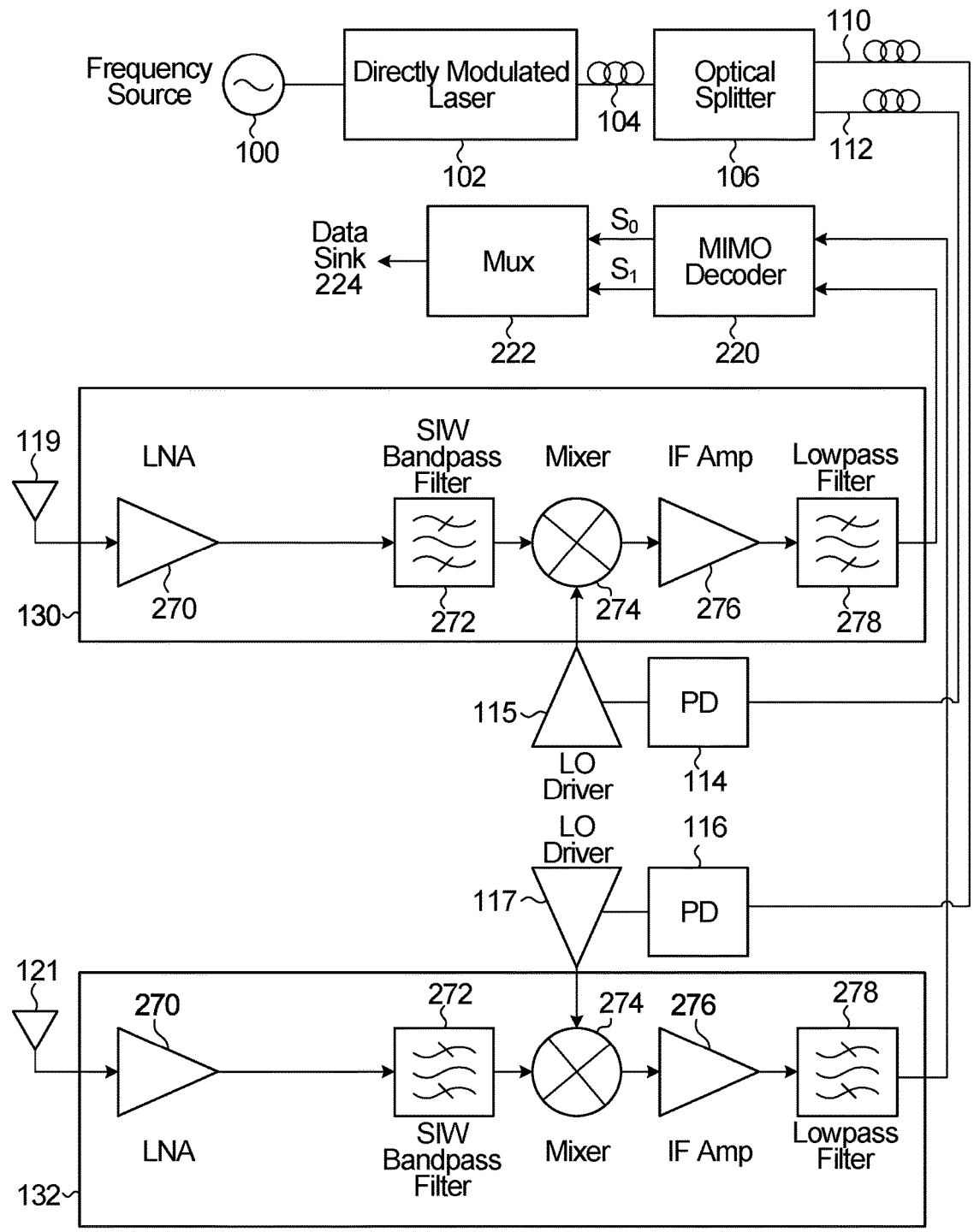
FIG. 2B depicts a block diagram of an example implementation of the microwave demodulators and an example implementation of a path for data reception.

Referring now to FIG. 2B, shown is a block diagram of a MIMO microwave system provided by an embodiment of the invention, which is based on the system of FIG. 1B, but shows specific details of an example implementation of the microwave demodulators 130,132 and also shows an example implementation of a path for data reception. For data reception, the demodulated signals from the microwave demodulators 130,132 are received by a MIMO decoder 220 which produces two data streams into two data streams $S_0, S_1$ which are then multiplexed into a single stream in multiplexer 222 for data sink 224. Microwave demodulator 130 will be described by way of example. The microwave demodulator 130 includes a low noise amplifier 270, SIW bandpass filter 272, mixer 274, IF amplifier 276 and low-pass filter 278 connected together in sequence. Antenna 119 is connected to the low noise amplifier 270 at the input of the microwave demodulator 130.

Figure 3:
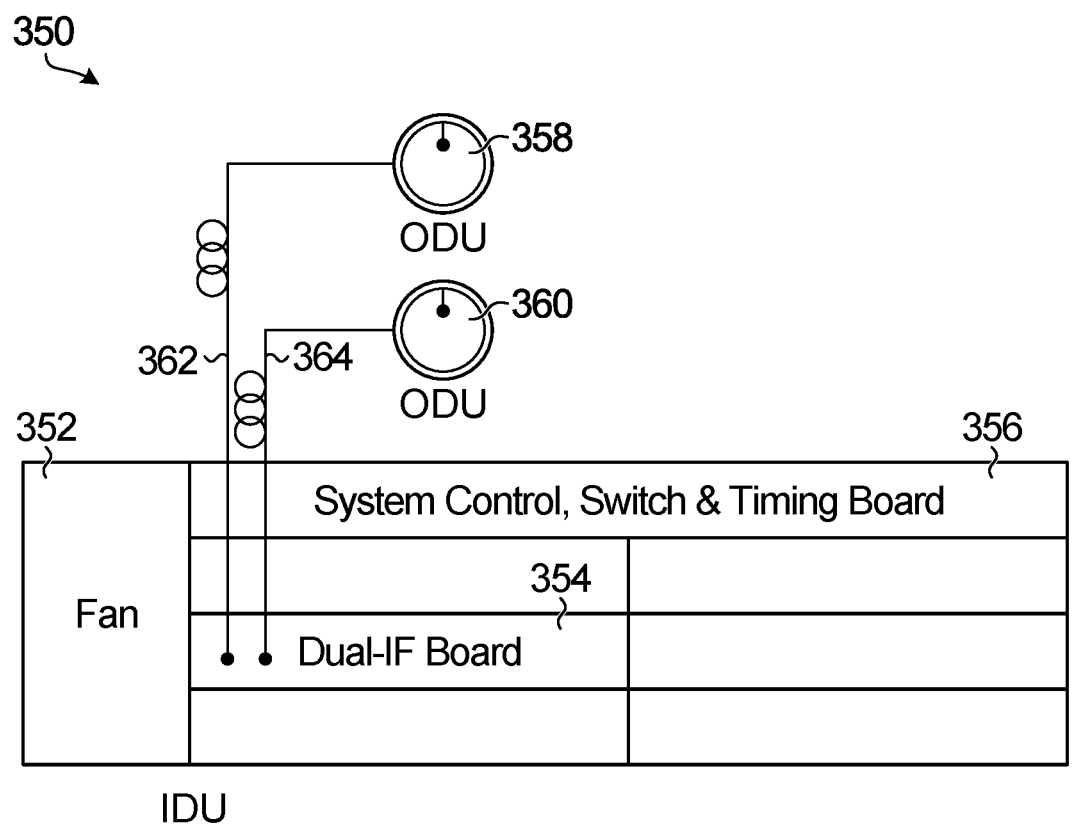
FIG. 3 depicts a schematic diagram of a split mount architecture provided by an embodiment of the invention.

Referring now to FIG. 3, shown is a schematic diagram of a split mount architecture provided by an embodiment of the invention. Shown is an indoor unit (IDU) 350 connected to two outdoor units (ODU) 358,360 via optical fibers 362,364. The IDU 350 has a fan 352, dual-IF board 354 and system control, switch and timing board 356. The functionality for generating a microwave frequency electrical signal or signals and converting to optical signals is performed by the dual-IF board 354. The outdoor units 358,360 include the microwave modulators and/or demodulators as per previous embodiments, and include the photodetectors to convert received optical signals to microwave carriers for local use.

Figure 4:
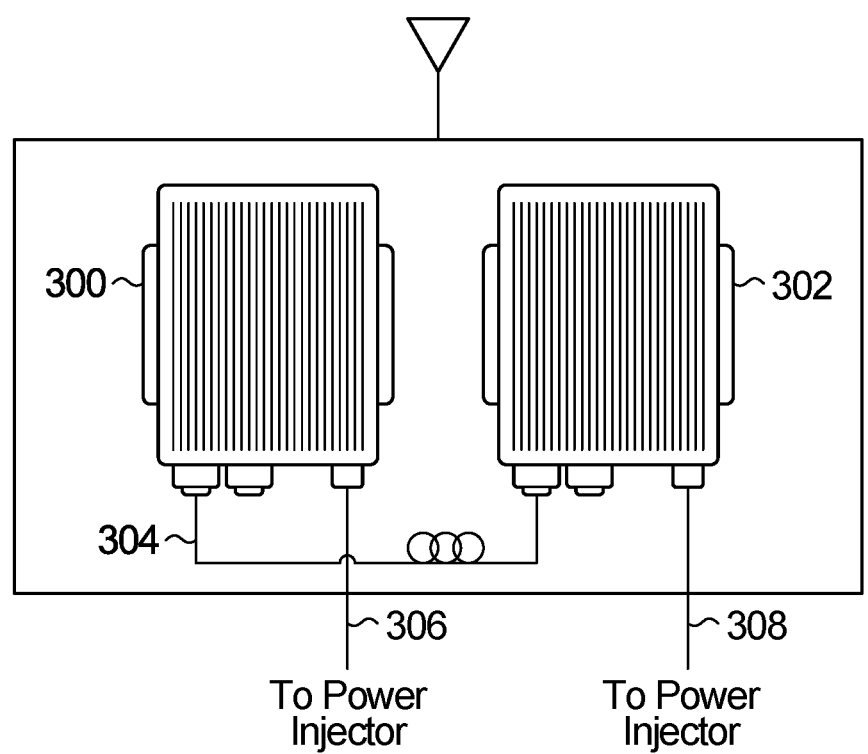
FIG. 4 depicts a schematic diagram of a master slave architecture provided by an embodiment of the invention.

Referring now to FIG. 4, shown is a schematic diagram of a master slave architecture provided by an embodiment of the invention. Shown are two outdoor units (ODU) 300,302. The outdoor units 300,302 are connected to respective outdoor network cables 306,308. Each of the outdoor units 300,302 includes a microwave modulator and/or microwave demodulator. The two outdoor units 300,302 are interconnected with an optical fiber 304. One of the outdoor units 300 includes a microwave frequency source (not shown), and this is propagated to the other outdoor unit 302 via the fiber 304 using the same functionality described previously for other embodiments, including directly modulated laser and photodetector (not shown), but not including a splitter. In this case, outdoor unit 300 functions as a master, and outdoor unit 302 as a slave. In some embodiments, the optical fiber 304 also carries digital samples between the two outdoor units 300,302 and the microwave frequency signal from the master unit 300 to the slave unit 302. The digital samples can be exchanged in both directions, while the microwave frequency signal is in one direction from ODU 300 to ODU 302 in the example illustrated.

The functionality of FIG. 1A or 1C can be used in a microwave MIMO transmitter, and the functionality of FIG. 1B or 1C can be used in a microwave MIMO receiver. In some embodiments, a one-way microwave MIMO link is implemented with a combination of a microwave MIMO transmitter that includes the functionality of FIG. 1A or 1C, and a microwave MIMO receiver that includes the functionality of FIG. 1B or 1C.

More generally, in another embodiment, a one-way link includes a microwave MIMO transmitter, and a microwave MIMO receiver. The microwave MIMO transmitter OR the microwave MIMO receiver employs a distributed microwave frequency source in accordance with one of the embodiments described herein.

A two-way microwave MIMO link can also be formed that includes the functionality of two one-way links in accordance with one of the examples described above. A first microwave MIMO transceiver includes a first microwave MIMO transmitter and a first microwave MIMO receiver, and a second microwave MIMO transceiver includes a second MIMO transmitter and a second microwave MIMO receiver.

Figure 5:
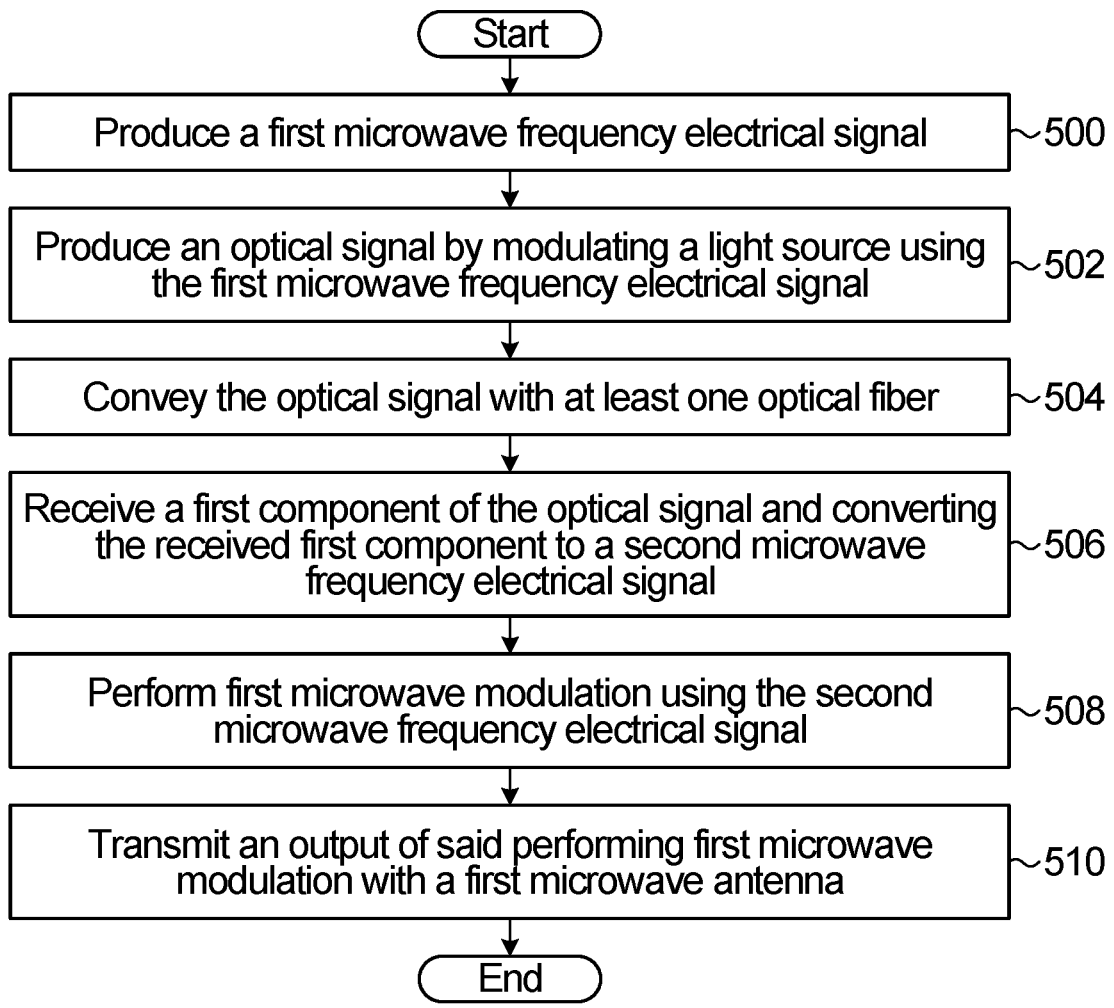
FIG. 5 is a flowchart of a method of performing photonic distribution of a microwave frequency electrical signal.

Referring now to FIG. 5, shown is a flowchart of a method of photonic distribution of a microwave electrical frequency signal. The method begins at block 500 with producing a first microwave frequency electrical signal. Block 502 involves producing an optical signal by modulating a light source using the first microwave frequency electrical signal. Block 504 involves conveying the optical signal with at least one optical fiber. Block 506 involves receiving a first component of the optical signal and converting the received first component to a second microwave frequency electrical signal. Block 508 involves performing first microwave modulation using the second microwave frequency electrical signal. Block 510 involves transmitting an output of said performing first microwave modulation with a first microwave antenna.

The method of FIG. 5 provides for the photonic distribution of a microwave electrical frequency signal via optical fiber for use in performing first microwave modulation. This can, for example, be from an indoor unit to an outdoor unit, or from one outdoor unit to another outdoor unit. Optionally, the same approach is used to convey the microwave frequency signal for use in performing second microwave modulation.

Numerous modifications and variations of the present disclosure are possible in light of the above teachings. It is therefore to be understood that within the scope of the appended claims, the disclosure may be practiced otherwise than as specifically described herein.

The invention claimed is:

1. A microwave transmit system comprising:
   a local oscillator configured to produce a first microwave frequency electrical signal;
   a light source configured to receive the first microwave frequency electrical signal and produce a microwave frequency optical signal;
   at least one optical fiber for conveying the microwave frequency optical signal;
   a first photodetector configured to receive a first component of the microwave frequency optical signal and convert the first component of the optical signal to a second microwave frequency electrical signal;
   a first microwave modulator configured to perform microwave modulation using the second microwave frequency electrical signal by mixing an input signal with the second microwave frequency electrical signal;
   a first microwave antenna configured to transmit an output of the first microwave modulator.

2. The system of claim 1 wherein the light source comprises a directly modulated laser diode.

3. The system of claim 1 further comprising:
   a second microwave modulator configured to receive the first microwave frequency electrical signal, and to perform microwave modulation using the first microwave frequency electrical signal by mixing another input signal with the first microwave frequency electrical signal;
   a second microwave antenna configured to transmit an output of the second microwave modulator.

4. The system of claim 3 comprising a first outdoor unit and a second outdoor unit, wherein:
   the first outdoor unit comprises the local oscillator, the light source, the second microwave modulator and the second microwave antenna;
   the second outdoor unit comprises the first photodetector, the first microwave modulator and the first microwave antenna.

5. The system of claim 1 further comprising:
an optical splitter that splits the optical signal into the first component of the optical signal and a second component of the optical signal;
wherein the at least one optical fiber comprises a first optical fiber for conveying the optical signal to the optical splitter, a second optical fiber for conveying the first component of the optical signal and a third optical fiber for conveying the second component of the optical signal;
a second photodetector configured to receive the second component of the optical signal and convert the second component of the optical signal to a third microwave frequency electrical signal;
a second microwave modulator configured to perform microwave modulation using the third microwave frequency electrical signal;
a second microwave antenna configured to transmit an output of the second microwave modulator.

6. The system of claim 5 comprising an indoor unit, a first outdoor unit and a second outdoor unit, wherein:
the first outdoor unit comprises the first photodetector, the first microwave modulator and the first microwave antenna;
the second outdoor unit comprises the second photodetector, the second microwave modulator and the second antenna;
the indoor unit comprises the local oscillator and the light source.

7. The system of claim 3 further comprising:
a MIMO processor configured to produce first and second MIMO components from an input data stream, wherein the first microwave modulator is connected to receive and modulate the first MIMO component as the input signal and the second microwave modulator is connected to receive and modulate the second MIMO component as the another input signal.

8. The system of claim 4 further comprising:
a MIMO processor configured to produce first and second MIMO components from an input data stream, wherein the first microwave modulator is connected to receive and modulate the first MIMO component and the second microwave modulator is connected to receive and modulate the second MIMO component.

9. The system of claim 5 further comprising:
a MIMO processor configured to produce first and second MIMO components from an input data stream, wherein the first microwave modulator is connected to receive and modulate the first MIMO component and the second microwave modulator is connected to receive and modulate the second MIMO component.

10. The system of claim 7 wherein the MIMO processor comprises a demultiplexer configured to demultiplex the input data stream into first and second data streams, and a MIMO precoder configured to produce first and second MIMO precoded outputs from the first and second data streams;
wherein the first and second MIMO components are the first and second MIMO precoded outputs.

11. The system of claim 4 further configured to exchange data signals between the two outdoor units using the at least one optical fiber.

12. A system comprising:
a microwave MIMO transmitter comprising the microwave transmit system of claim 1;
a microwave MIMO receiver.

13. A system comprising:
a first microwave MIMO transceiver comprising a first microwave MIMO transmitter and a first microwave MIMO receiver, the first microwave MIMO transmitter comprising the microwave transmit system of claim 1;
a second microwave MIMO transceiver comprising a second microwave MIMO transmitter and a second microwave MIMO receiver.

14. A method comprising:
producing a first microwave frequency electrical signal;
producing a microwave frequency optical signal by modulating a light source using the first microwave frequency electrical signal;
conveying the microwave frequency optical signal with at least one optical fiber;
receiving a first component of the optical signal and converting the received first component to a second microwave frequency electrical signal;
performing first microwave modulation using the second microwave frequency electrical signal by mixing an input signal with the second microwave frequency electrical signal;
transmitting an output of said performing first microwave modulation with a first microwave antenna.

15. The method of claim 14 further comprising:
receiving the first microwave frequency electrical signal, and performing second microwave modulation using the first microwave frequency electrical signal by mixing another input signal with the first microwave frequency source;
transmitting an output of performing second microwave modulation with a second microwave antenna.

16. The method of claim 14 further comprising:
splitting the optical signal into the first component of the optical signal and a second component of the optical signal with an optical splitter;
wherein conveying the optical signal with an optical fiber comprises conveying the optical signal to the optical splitter with a first optical fiber, conveying the first component of the optical signal with a second optical fiber, and conveying the second component of the optical signal with a third optical fiber;
the method further comprising:
receiving the second component of the optical signal and converting the second component of the optical signal to a second microwave frequency electrical signal;
performing second microwave modulation using the second microwave frequency electrical signal by mixing another input signal with the second microwave frequency electrical signal;
transmitting an output of performing second microwave modulation with a second transmit antenna.

17. The method of claim 15 further comprising:
performing MIMO processing to produce first and second MIMO components from an input data stream,
wherein performing first microwave modulation comprises modulating the first MIMO component, and performing second microwave modulation comprises modulating the second MIMO component.

18. The method of claim 17 wherein performing MIMO processing comprises:
demultiplexing the input data stream into first and second data streams;
MIMO precoding the first and second data streams to produce first and second MIMO precoded outputs;
wherein the first and second MIMO components are the first and second MIMO precoded outputs.

19. The method of claim 15 further comprising:
exchanging data signals between two outdoor units using the at least one optical fiber.

* * * * *